US010521358B2

(12) United States Patent
Nambiar et al.

(10) Patent No.: US 10,521,358 B2
(45) Date of Patent: Dec. 31, 2019

(54) SYSTEM, APPARATUS AND METHOD FOR PRIORITIZING THE STORAGE OF CONTENT BASED ON A THREAT INDEX

(71) Applicant: Niara, Inc., Sunnyvale, CA (US)

(72) Inventors: Brijesh Nambiar, Sunnyvale, CA (US); Prasad Palkar, Sunnyvale, CA (US); Ramsundar Janakiraman, Fremont, CA (US); Shankar Subramaniam, Cupertino, CA (US); Giri Gopalan, Saratoga, CA (US); Mohan Parthasarathy, Cupertino, CA (US); Steven Alexander, Woodside, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/743,892

(22) Filed: Jun. 18, 2015

(65) Prior Publication Data
US 2015/0370723 A1    Dec. 24, 2015

Related U.S. Application Data

(60) Provisional application No. 62/015,355, filed on Jun. 20, 2014.

(51) Int. Cl.
*G06F 12/121*    (2016.01)
*G06F 21/55*    (2013.01)
(Continued)

(52) U.S. Cl.
CPC .......... *G06F 12/121* (2013.01); *G06F 21/552* (2013.01); *H04L 47/2441* (2013.01); *H04L 63/1425* (2013.01)

(58) Field of Classification Search
CPC ....................................................... G06F 12/121
(Continued)

(56) References Cited

U.S. PATENT DOCUMENTS 5,331,646 A    7/1994 Krueger et al.
5,813,009 A *  9/1998 Johnson ............ G06F 17/30017
                                                    707/695
(Continued)

OTHER PUBLICATIONS

PCT/US2015/036987 filed Jun. 22, 2015 International Search Report and Written Opinion dated Sep. 21, 2015.
(Continued)

*Primary Examiner* — Gautam Sain

(57) ABSTRACT

A network sensor that features a data store and a packet processing engine. Communicatively coupled to the data store, the packet processing engine is configured to (i) generate a retention priority for at least a first flow within a first storage region of a plurality of storage regions and (ii) identify, in response to an eviction request, the priority of each of the plurality of storage regions. The priority of the first storage region is partially based on the retention priority associated with the first flow while the priority of a second storage region is based on retention priorities associated with flows stored within the second storage region. The packet processing engine also is configured to identify, through use of the retention priorities of the stored flows within the first storage region, which flows are to be retained and which flows are to be evicted.

21 Claims, 10 Drawing Sheets

(51) Int. Cl.
  *H04L 29/06* (2006.01)
  *H04L 12/851* (2013.01)
(58) Field of Classification Search
  USPC .......................................................... 711/159
  See application file for complete search history.

(56) References Cited

U.S. PATENT DOCUMENTS

| | | | |
|---|---|---|---|
| 7,913,303 B1* | 3/2011 | Rouland | H04L 63/0227 726/22 |
| 8,495,747 B1 | 7/2013 | Nakawatase et al. | |
| 2006/0095695 A1 | 5/2006 | Daniels et al. | |
| 2006/0143388 A1* | 6/2006 | Wintergerst | G06F 12/126 711/130 |
| 2007/0150691 A1* | 6/2007 | Illendula | G06F 12/0246 711/170 |
| 2008/0294696 A1 | 11/2008 | Frandzel | |
| 2009/0106843 A1* | 4/2009 | Kang | H04L 63/1433 726/25 |
| 2010/0098318 A1 | 4/2010 | Anderson | |
| 2011/0016091 A1 | 1/2011 | Prahlad et al. | |
| 2011/0035802 A1 | 2/2011 | Arajujo, Jr. et al. | |
| 2012/0102003 A1 | 4/2012 | Bhattacherjee et al. | |
| 2012/0102136 A1 | 4/2012 | Srebrny et al. | |
| 2013/0018852 A1 | 1/2013 | Barton et al. | |
| 2013/0132653 A1 | 5/2013 | Post et al. | |
| 2014/0181432 A1* | 6/2014 | Horn | G06F 12/0253 711/159 |
| 2014/0237545 A1* | 8/2014 | Mylavarapu | H04L 63/1433 726/3 |
| 2015/0281260 A1* | 10/2015 | Arcamone | H04L 63/1408 726/11 |

OTHER PUBLICATIONS

U.S. Appl. No. 14/743,902, filed Jun. 18, 2015 Advisory Action dated Oct. 19, 2017.
U.S. Appl. No. 14/743,902, filed Jun. 18, 2015 Final Office Action dated Jul. 20, 2017.
U.S. Appl. No. 14/743,902, filed Jun. 18, 2015 Non-Final Office Action dated Feb. 7, 2017.
U.S. Appl. No. 14/743,902, filed Jun. 18, 2015 Non-Final Office Action dated Jan. 12, 2018.

* cited by examiner

SYSTEM, APPARATUS AND METHOD FOR PRIORITIZING THE STORAGE OF CONTENT BASED ON A THREAT INDEX

CROSS-REFERENCE TO RELATED APPLICATIONS

This application claims the benefit of U.S. Provisional Application No. 62/015,355, filed Jun. 20, 2014, the entire contents of which are incorporated herein by reference.

FIELD

Embodiments of the disclosure relate to the field of data storage for network and cyber security systems. More specifically, one embodiment of the disclosure relates to a system, apparatus and method for prioritizing stored content and/or the storage of newly received content based on a threat index.

GENERAL BACKGROUND

Over the last few years, the general populous has encountered the proliferation of malicious software (sometimes referred to as "malware") over the Internet. Malware has many forms including exploits, namely information that attempts to take advantage of a vulnerability in software that is loaded onto an electronic device in order to adversely influence or attack operations of that electronic device. Despite repeated efforts by detection systems and software patches to address software vulnerabilities, malware continues to evade and infect electronic devices worldwide.

In combatting the spread of malware, it is becoming paramount that vast amounts of information associated with network traffic, which is propagating to/from/within an enterprise network over a prolonged period of time, is persistently stored. This stored information offers immeasurable value for incident response testing so that security personnel can better understand when and how network breaches occurred, either from an external threat entity that infected a network resource with an exploit as describe above or from an internal threat entity being someone who understands the enterprise network and illicitly acquires sensitive data. However, given ever increasing data transmission speeds and the realization that, on average, network breaches are not detected until over 200 days from their original occurrence, it is becoming cost prohibitive for conventional security systems to maintain much of the needed information using conventional package storage solutions.

Currently, to gain reclaim physical storage, conventional packet storage solutions normally are configured to erase stored packets on a first-in, first-out (FIFO) basis. However, this FIFO scheme fails to address the fact that various packets, independent of time of detection, may be more valuable in subsequent incident response testing than later stored packets.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
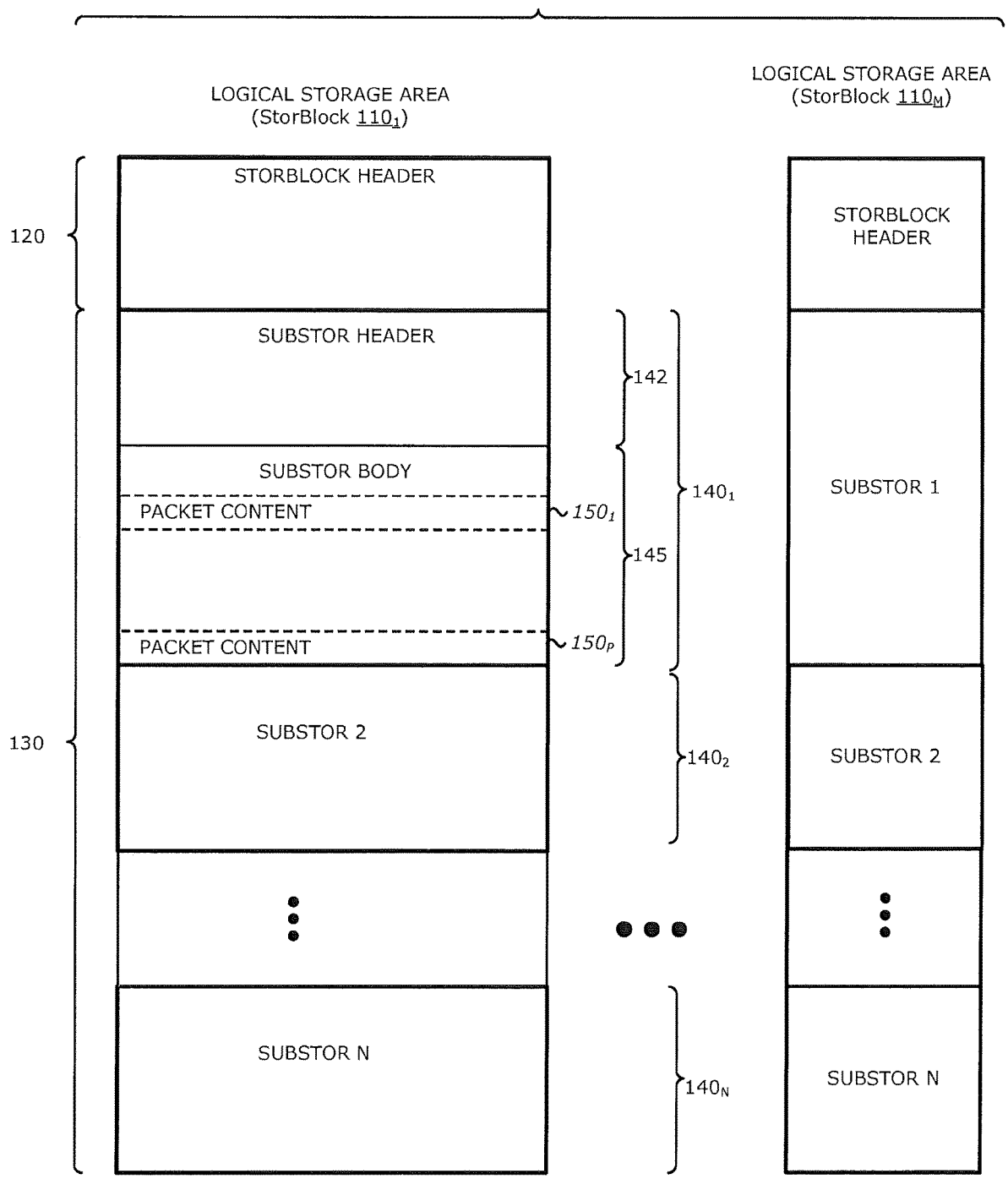
FIG. 1 is an exemplary block diagram of a logical storage architecture that is configured to support priority assignment scheme for storage blocks for storage block eviction.

Various embodiments of the disclosure relate to a security architecture that assigns a retention priority to stored content based, at least in part, on threat index values associated with one or more flow attributes of the stored content. These flow attributes (also referred to as "factors") may include (i) the particular node (e.g., user, endpoint device, or server) being the source (or destination) for the stored content; (ii) the group affiliation (e.g., group to which the node belongs); (iii) the destination (e.g., Internet Protocol "IP" address, Domain Name System "DNS" server identifier, Uniform Resource Locator "URL", etc.) for the stored content; and/or (iv) the type(s) of objects being part of the stored content (e.g., non-executable file having an executable, Javascript® or macro).

More specifically, a threat index value is maintained for different flow attributes (factors and sub-factors) that are associated with a stored plurality of related packets (also referred to as a "flow"). The "threat index value" is a static or dynamic value which identifies the likelihood that a particular flow attribute is associated with a malicious event that is part of a network breach. The threat index values assigned to each of the flow attributes may be based on monitored behaviors.

As an illustrative example, the threat index value for a particular flow attribute (e.g., a particular endpoint device) may be based on certain behaviors exhibited by that particular endpoint device. For instance, an endpoint device that has a disabled firewall, is attempting to access other endpoint devices or is involved in unusual network traffic patterns may be assigned a higher threat index value than endpoint devices operating normally.

Hence, the combination of threat index values associated with the identified flow attributes is used to compute a retention priority for that flow. The "retention priority" is information that identifies which stored content within a flow may be more valuable for identifying the particulars associated with a network breach (e.g., when/how the network breach occurred, compromised data, network device(s) infected, etc.). As a result, it is not uncommon for stored flows with multiple flow attributes having non-zero threat index values to be assigned a higher retention priority as the stored content within such flows has a higher tendency of being associated with a malicious event.

Additionally, the security architecture may assign a priority to a storage block based on the retention priorities associated with the flows stored within that storage block, although it is noted that the priority produced by the retention priorities may be adjusted to provide a priority ranking (1-to-M) for each of the storage blocks collectively representing the physical storage medium for data capture storage. As a result, the "block priority" may be used as a filter to identify which storage blocks include a collection of stored flows that are more likely associated with malicious activity and which are less likely.

Stated differently, according to one embodiment of the disclosure, the block priority identifies the storage blocks best suited for eviction while the retention priority which may be used to determine which flows may be deleted and which flows may need to be copied to another storage block prior to the storage block receiving new data for storage.

Herein, the block priority and/or the retention priority are used during an eviction process to reclaim storage space. As stated previously, the retention priority indicates which stored content within a flow may be more valuable for identifying the particulars associated with a network breach. These particulars may be used to remediate malware responsible for the network breach. The block priority indicates which storage blocks are best suited for eviction given that these blocks may have a lesser amount of data that should be retained.

According to one embodiment of the disclosure, a network sensor accumulates data associated with a flow (e.g., series of related-packets that may represent one or more objects), which is stored in persistent storage and may be subsequently accessed by network security personnel for network health management (e.g., malware detection, incident response testing, etc.). At some point, this persistent storage will reach a capacity threshold (e.g., exceeds a certain percentage of storage capacity). By that time, the network sensor may have already conducted a time-based scan in which (i) retention priorities have been determined for stored flows based, at least in part, on detected flow attributes and their corresponding threat index values and (ii) block priorities have been determined for each storage block based, at least in part, on the retention priorities associated with corresponding flows stored within the storage block. The storage blocks may be logical representations of the persistent storage.

According to one embodiment of the disclosure, block priorities may be assigned to each storage block and retention priorities may be assigned to each flow stored within a particular storage block. Both the block priority and the retention priority are used during eviction of certain storage regions, such as physical storage corresponding to a particular storage block ("StorBlock" or "SubStor") as described below. During this process, identified storage blocks having the lowest block priority may be erased (or prepared to receive new data) while storage blocks having higher block priorities are retained. It is contemplated that, prior to erasing (or preparing for receipt of new data), the identified storage blocks may feature flows having high retention priorities. In this case, the packets and/or objects associated with these flows are copied into another (non-evicted) storage block prior to erasure, normally one of the storage blocks that is currently not being used (free storage block).

According to one embodiment, the assignment of the retention priority may be accomplished through a priority mapping without storing the retention priorities within the packets associated with the flow. Of course, as an alternative deployment, it is contemplated that the retention priorities may be stored within one or more of the packets being part of the flow or headers.

It is contemplated that the amount of time that content resides within a particular storage region may cause a reduction in the threat index. For instance, the threat index value associated with a particular flow attribute may be decremented by a prescribed value for each time unit (e.g., week, day, hour, etc.) that the stored content resides within the storage region beyond a predetermined length of time (e.g. 250 days). This threat decay function ensures that high priority content does not endlessly remain in the physical storage.

It is contemplated that the threat index values residing with the threat index maps may be provided to the network sensor via a data analysis engine. The data analysis engine analyzes metadata and other content uploaded from one or more network sensor devices to determine threat (risk) levels associated with a particular flow attribute (e.g., any particular user, endpoint device or server; a particular IP address, DNS identifier or URL); group; and/or object) needs to be adjusted. Such adjustments may alter various retention priorities for stored flow and/or block priorities within this priority assignment scheme.

I. Terminology

In the following description, certain terminology is used to describe features of the invention. For example, in certain situations, the terms "sensor", "logic," and "engine" are representative of hardware, firmware and/or software that is configured to perform one or more functions. As hardware, a sensor (or logic or engine) may include circuitry having data processing and/or data capturing functionality combined with data transmission and/or storage functionality. For instance, a sensor may include a processor (e.g., digital signal processor, microprocessor with one or more processor cores, a programmable gate array, a microcontroller, an application specific integrated circuit, etc.), semiconductor memory, and/or wireless or wired transmitter and/or transceiver circuitry.

Alternatively, the sensor (or logic or engine) may be software in the form of one or more software images or software modules, such as executable code in the form of an executable application, an application programming interface (API), a routine or subroutine, a script, a procedure, an applet, a servlet, source code, object code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The terms "data" and "content" are broadly defined as information, normally in digitized form. Hence, data and content may include control data, management data or any other type of metadata.

The term "traffic" generally refers to one or more flows of information, where each "flow" is a series of related packets. According to one embodiment, a start of the series of related packets may include a 5-tuple that includes at least a Source address, Destination Address, and length. In transit or at rest, this series of related packets may include one of more objects, namely a subset of the related packets that collectively form either an executable that is packed or a non-executable such as a dynamically link library (DLL), a Portable Document Format (PDF) file, a JavaScript® file, Zip® file, a Flash® file, a document (for example, a Microsoft® Office® document, Word® document, etc.), an electronic mail (email), downloaded web page, a text message, or the like. A "packet" generally refers to any information transmitted in a prescribed format.

The term "storage block" refers to a prescribed amount of physical storage (e.g., disk space, semiconductor memory space, etc.). The storage block may be a logical representation of the prescribed amount of physical storage or the physical storage itself.

The term "transmission medium" is a physical or logical communication path between two or more network devices (e.g., one of the network devices being an endpoint device with data processing and network connectivity such as, for example, a firewall, a desktop or laptop computer, netbook, tablet, smart phone, set top box, wearable computing device, or a video game console. Other types of network devices may include a server; a mainframe; or intermediary devices such as a router, a switch, a bridge. For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

II. General Logical Storage Architecture

Referring to FIG. 1, an exemplary block diagram of a logical storage architecture 100 that may be used for packet content storage is shown. The logical storage architecture 100 is configured for storage prioritization of content associated with a flow. Certain types of content, such as objects as in PDF files or the like, may be additionally and separately stored, perhaps in accordance with a different type of logical storage architecture, to provide access to entire objects with having to parse through packet storage.

According to one embodiment of the disclosure, the logical storage architecture 100 includes one or more contiguous, logical storage blocks (referred to herein as "StorBlocks") $110_1$-$110_M$ (M≥1), where each StorBlock $110_1$ . . . or $110_M$ includes a header 120 and a body 130. As each StorBlock $110_1$, . . . , and $110_M$ may be configured as a large storage area, management of the StorBlocks $110_1$-$110_M$ may be a challenge. As a result, the body 130 of StorBlock $110_1$ may be segmented into a number of smaller storage blocks (referred to herein as "SubStors") $140_1$-$140_N$ (N≥1).

Herein, StorBlocks $110_1$-$110_M$ formulate a hardware abstraction layer that is configured to directly or indirectly map to a physical storage. This hardware abstraction allows for adaptation to multiple platform environments including one or more virtual machines, cloud computing, purpose built hardware, or the like. More specifically, on the lower layer of the logical storage architecture 100, an integer multiple of StorBlocks $110_1$-$110_M$ may map to a portion or the entire physical storage (e.g., a disk partition, a volume, etc.). For example, the logical storage architecture 100 may be configured with four (M=4) StorBlocks $110_1$-$110_4$ that logically map onto a two terabyte (TB) disk, where each StorBlock $110_1$, . . . , and $110_4$ is assigned 512 gigabytes (GB) of memory.

Furthermore, in response to an increase in storage capacity (e.g., increase disk density), hardware abstraction does not require the layout of the storage architecture to be remodeled. Rather, the number or size of the StorBlocks $110_1$-$110_M$ may be increased. As the size of each StorBlock $110_1$-$110_M$ may be static or dynamically adjustable, each StorBlock $110_1$ . . . or $110_M$ may be assigned the same amount of physical memory as other StorBlocks or different StorBlocks $110_1$ . . . or $110_M$ may be assigned to different amounts of physical memory.

As stated previously, according to one embodiment of the disclosure, StorBlocks $110_1$-$110_M$ may be segmented into logical storage blocks (SubStors) $140_1$-$140_N$, which may have a size from one megabyte (1 MB) up to the order of tens of megabytes (e.g., 64 MB). Hence, information may be managed as SubStors $140_1$-$140_N$, where each of the SubStors (e.g., SubStor $140_1$) includes a header 142 and a body 145 that includes packet content $150_1$-$150_P$ (P≥1), which may include compressed data from "P" packets associated with network traffic and/or information uploaded by other sources as described below in reference to FIGS. 3A-3B. According to one embodiment of the disclosure, each SubStors $140_1$-$140_N$ may be assigned to store a particular flow so that an identifier of the flow (Flow_ID) would be equivalent to the identifier of the particular SubStor (SubStor_ID).

Herein, according to one embodiment of the disclosure, information within a particular SubStor $140_1$ . . . or $140_N$ may be stored within physical storage (disk/volume). When the storage capacity for a particular SubStor (e.g., SubStor $140_1$) reaches a prescribed threshold (e.g., full, exceeds a certain percentage of capacity, etc.), the SubStor $140_1$ (e.g., body and/or header of packets $150_1$-$150_P$) may undergo compression prior to being stored within the physical storage, where the analysis as to whether the prescribed threshold has been reached may be based on the uncompressed state or the compressed state. Hence, some of the conditions that may decide the size of the SubStors $140_1$-$140_N$ and the prescribed threshold of transfer of the information to physical storage may include compression efficiency and retrieval latency.

On the higher layer of the logical storage architecture, information may be transferred into one of the SubStors $140_1$-$140_N$ in multiple ways. For instance, information associated with one or more flows handled by a particular processor thread can be routed to a selected SubStor (e.g., SubStor $140_1$). Thus, management of SubStor $140_1$ can be conducted without any synchronization, and when SubStor $140_1$ reaches the prescribed threshold, the information stored within SubStor $140_1$ may be pushed to the physical storage. As another option, all encrypted flows or flows using a specific certificate can be routed to a specific SubStor (e.g., SubStor $140_2$) without waiting for keys. When the keys are provided at later point in time, the search overhead to decrypt the data for a flow greatly reduces, when a certificate is provided at some later point after the capture. As yet another option, information is transferred based on policy, where packets from specific hosts (e.g., packets from an endpoint device controlled by a high-level official or executive) can be redirected to a specific SubStor (e.g., SubStor $140_N$).

Each of the storage blocks (e.g., StorBlocks $110_1$-$110_M$ and/or SubStors $140_1$-$140_N$) may be assigned a priority (referred to herein as a "block priority"). The block priority may be used during an eviction process, namely the reclaiming of physical storage area that has already been written to store packet data associated with various flows, in order to determine which StorBlocks (or SubStors) may be overwritten.

More specifically, during an eviction process, a first storage block (e.g., a first StorBlock $110_1$ or SubStor $140_1$) may be assigned a first block priority that is less than a second block priority assigned to a second storage block (e.g., second StorBlock $110_2$ or SubStor $140_2$). According to one embodiment of the disclosure, the differences in block priority may be due to the fact that the retention priorities assigned to flows stored within the first StorBlock $110_1$ are determined to be less than the retention priorities assigned to the flows stored within the second StorBlock $110_2$. This determination may involve a summation of the retention priorities associated with the stored flows, where the same or different weighting among the flows may be used. By weighting flows differently based on flow type, time of detection or other parameters, different flows may have more effect on the block priority than others.

According to one embodiment, the assignment of priority may be accomplished through separate maps (e.g., one or more tables, linked lists, etc.) without storing the block priority or the retention priorities directly within the storage block itself. Of course, it is contemplated that the block priority and/or retention priority may be included as part of the storage block (e.g., within a header or body of a StorBlock $110_1$ . . . $110_M$ and/or SubStors $140_1$-$140_N$).

III. Exemplary System Architecture

Figure 2:
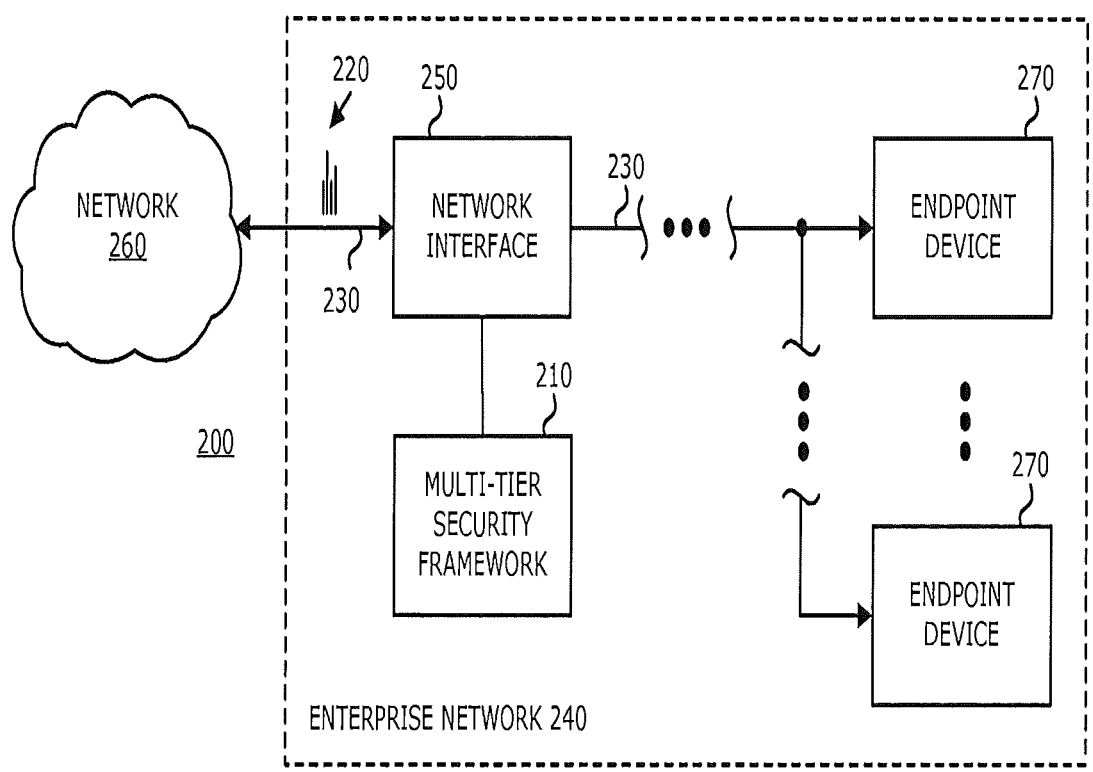
FIG. 2 is an exemplary block diagram of a communication system deploying a multi-tier security framework.

Referring to FIG. 2, an exemplary block diagram of a communication system 200 deploying a multi-tier security framework 210 is shown. The security framework 210 monitors and analyzes information associated with network traffic 220 that is routed over transmission medium 230 forming an enterprise network 240. According to one embodiment of the disclosure, the security framework 210 receives, processes and/or stores input information associated with communications occurring within the enterprise network 240.

As shown, the security framework 210 may be communicatively coupled with the transmission medium 230 via a network interface 250. In general, the network interface 250 operates as a data capturing device (sometimes referred to as a "tap" or "network tap") that is configured to receive information propagating to/from one or more network devices 270 and provide at least some of this information to the security framework 210. For instance, the network interface 250 may provide a series of packets or certain content within the packets. Of course, input information from the network interface 250 may be duplicative of information previously detected over transmission medium 230. Alternatively, although not shown, the security framework 210 may be positioned in-line with the network device(s) 270 without the network interface 250. As another alternative, the network interface 250 may be part of the security framework 210.

Herein, as an illustrative example, the input information may include information associated with one or more packets forming incoming network traffic received via a communication network 260. The communication network 260 may include a public network (e.g., Internet) in which case one or more security appliances, such as a firewall for example, are positioned to receive and process network traffic prior to receipt by logic within the security framework 210. Alternatively, the communication network 260 may be a private network such as a wireless data telecommunication network, wide area network (WAN), a type of local area network (LAN), or a combination of networks. As other illustrative examples, the input information may include log information, netflow (e.g., OSI Layer 4 "L4" information regarding communications monitored by other network devices), and host telemetry information (e.g., information from network devices 270), as described below.

Although FIG. 2 illustrates the multi-tier security framework 210 within the enterprise network 240, in some embodiments, the multi-tier security framework 210 is at least partially located outside the enterprise network 240. For example, at least some of the functions of the multi-tier security framework 210 may be performed over a different type of network (e.g., in the "cloud" over the Internet or other WAN). This is illustrated with the multi-tier security framework 210 in dashed lines in the communication network 260.

Figure 3A:
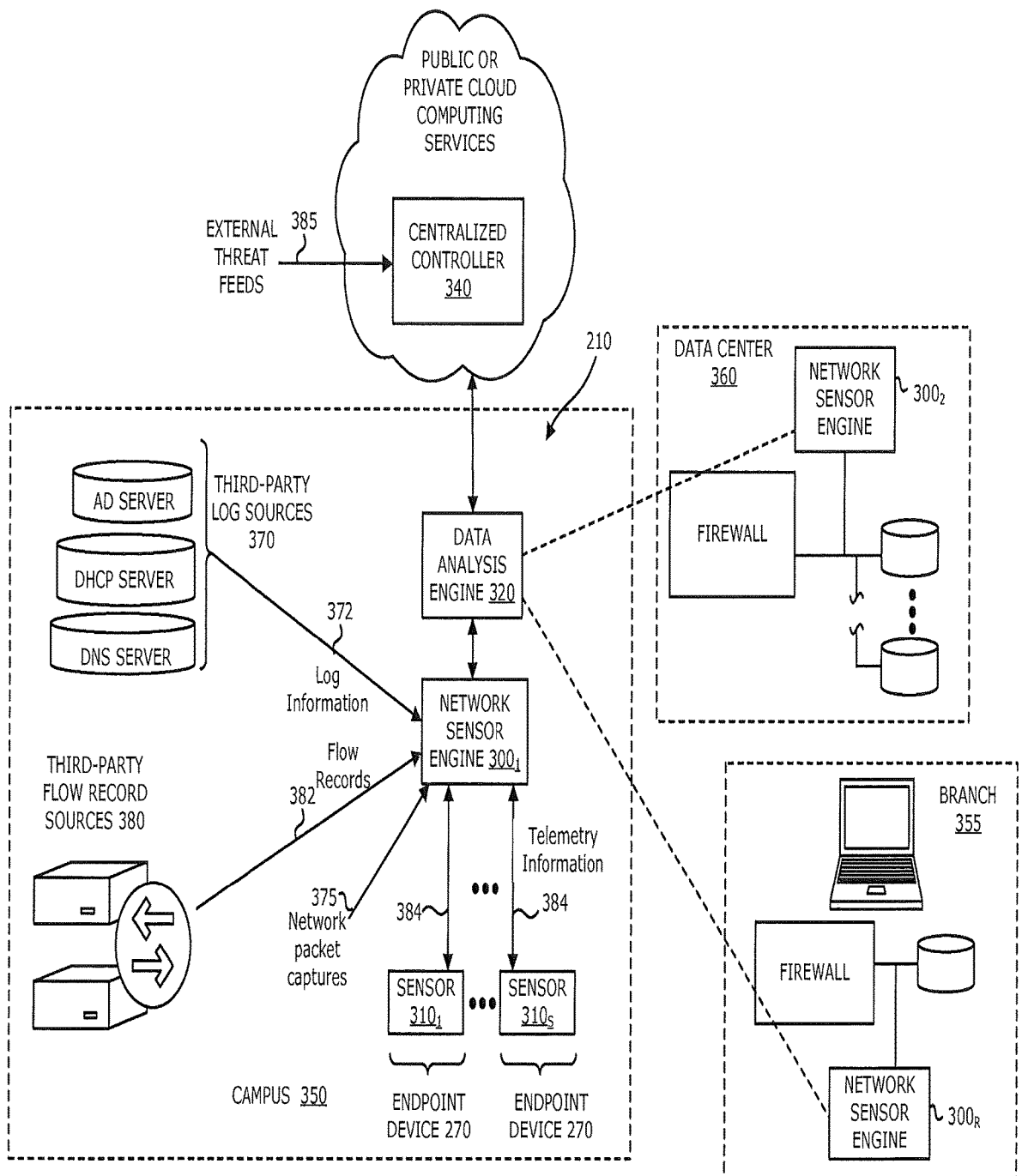
FIG. 3A is an exemplary block diagram of the security framework of FIG. 2.
Figure 3B:
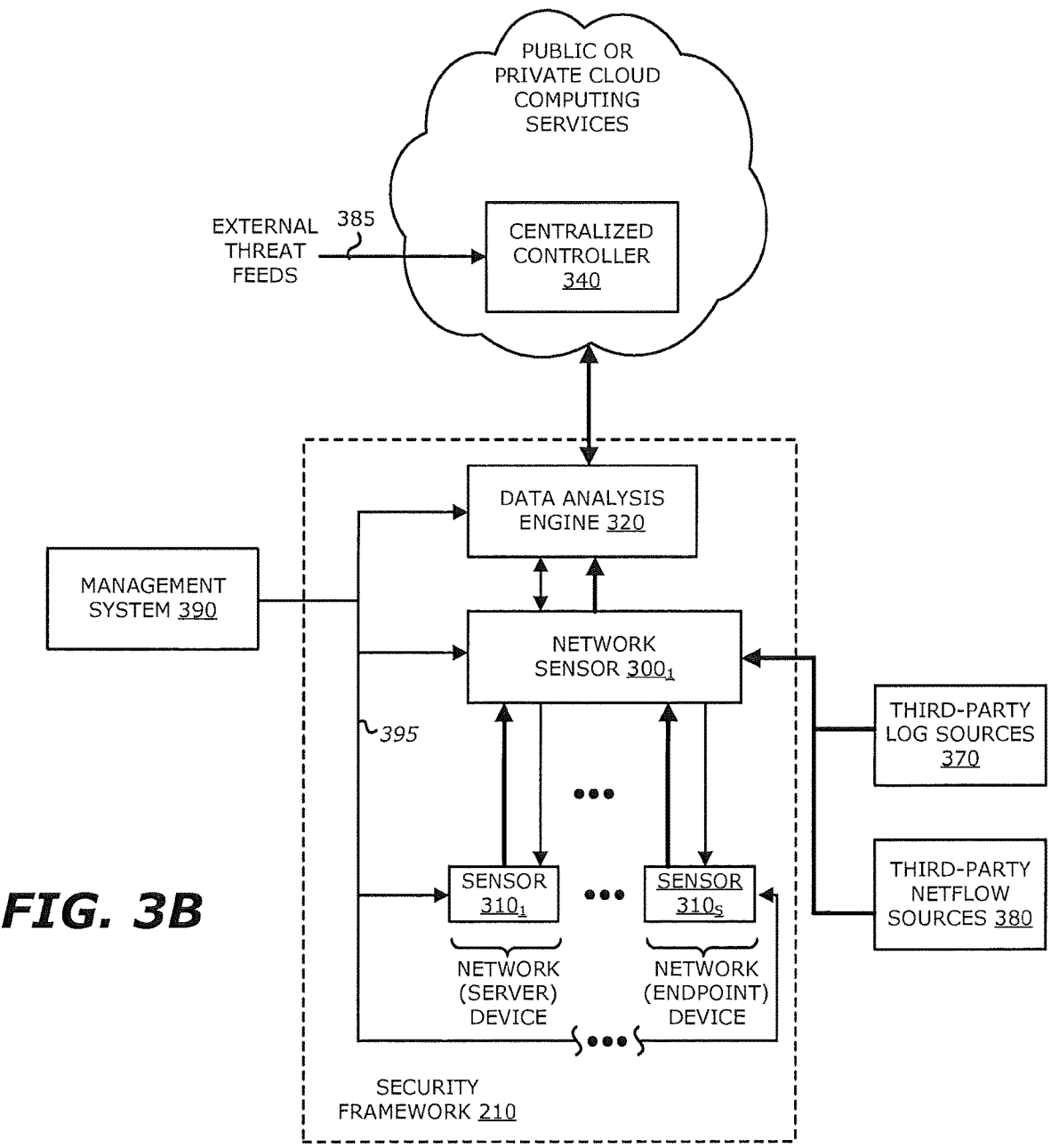
FIG. 3B is a general block diagram of the interoperability of a management system and the security framework of FIG. 2.

According to one embodiment of the disclosure, as illustrated in FIGS. 3A and 3B, the security framework 210 comprises one or more network sensor engines $300_1$-$300_R$ (R≥1), a data analysis engine 320 and a centralized controller 340. Deployed at various locations within the enterprise network 140 (e.g., campus 350, branch 355, data center 360, etc.), as shown in FIG. 3A, each of the one or more network sensor engines (also referred to as "network sensor engine(s)") $300_1$-$300_R$ may be configured to receive, process and/or store (i) information associated with monitored incoming packets that form network traffic, including extracted objects (e.g., files) (e.g., network packet captures 375 received from the network interface 250 or other devices on the network such as receipt through a SPAN port); (ii) log information from different network devices (e.g., third-party log sources 370 such as Active Directory® server logs, Domain Name System "DNS" server logs, Dynamic Host Configuration Protocol "DHCP" server logs, etc.); (iii) flow records 382 from third-party flow record sources 380; and (iv) host telemetry information 384 from one or more endpoint devices 270 (e.g. client devices and/or servers). Given the amount of information that is being stored, each network sensor engine $300_1$, . . . , or $300_R$ is configured to perform deduplication using bounded deduplication references and/or conduct redundancy elimination in packet storage, as described below and illustrated in FIGS. 4A-7.

As further shown in FIGS. 3A and 3B, the network sensor(s) $300_1$-$300_R$ include at least a first network sensor $300_1$ that is adapted to communicate with one or more device sensors $310_1$-$310_S$ (S≥1), which collect and/or store information associated with the network devices 270 (e.g., endpoint devices and/or servers) that is referred to as host telemetry data. These device sensor(s) $310_1$-$310_S$ may be configured as lightweight software sensors deployed on network devices 270 (e.g., endpoint devices and/or servers), where the device sensor(s) $310_1$-$310_S$ are adapted to gather information associated with the network devices 270 and provide such information to a particular network sensor (e.g., first network sensor $300_1$) of the network sensor(s) $300_1$-$300_R$. For example, the gathered information of a particular endpoint device may include registry settings and/or registry changes of the endpoint device, running processes list of the endpoint device, memory usage information of the endpoint device, network connection information of the endpoint device, operating system patch level of the endpoint device, files modified since the last update, and/or disk/file system activity of the endpoint device. The gathered information may be especially useful when the network devices 270 may be infected. For example, memory usage may be gathered that is associated with malicious activity, network connectivity information may be gathered that is associated with malware, disk/file system activity may be gathered that is associated with malware, etc.

There may be different device sensors deployed for different devices (e.g., a device sensor for a server may be configured to gather different information than a device sensor for an endpoint device). By way of a specific example, where the network device 270 is a server, the host telemetry information may include application logs that indicate a history of applications running on the server, active network connections of the server, files modified on the server, hash of critical files of the server, information (e.g., file name, access date/time, etc.) that has been exfiltrated, or the like.

Furthermore, the first network sensor $300_1$ is adapted to receive network packets propagating to/from one or more devices in the network (e.g., information to/from the network devices 270 or other network devices). In some embodiments the first network sensor $300_1$ is adapted to extract or generate at least metadata from the network packets. For example, in a specific embodiment, the first network sensor engine $300_1$ is adapted to perform deep packet inspection (DPI) on the packet captures to extract metadata from L2-L7 headers. For example, the first network sensor $300_1$ may extract headers associated with Hypertext Transfer Protocol (HTTP) messages.

Furthermore, the first network sensor $300_1$ is adapted to receive log information 372 from one or more remotely located servers (e.g., Active Directory® server, DNS server, DHCP server, etc.) that may form part of the enterprise network 140 or operate in concert with network devices within the enterprise network 140. Herein, the "log information" 372 includes information pertaining to events that have been recorded during communications between the remotely located servers and various endpoint devices. In some embodiments the first network sensor engine $300_1$ is adapted to extract and/or generate metadata from the log information 372.

As an example, the first network sensor $300_1$ may be adapted to receive log information 372 from any of the third-party log sources 370 such as an Active Directory® server, which enables the first network sensor $300_1$ to generate a user/Internet Protocol (IP) address mapping. Since IP addresses are dynamic and may be re-assigned and the security framework is capable of storing data for a prolonged time period, the user/IP address mapping enables the first network sensor $300_1$ to determine a particular user (and her corresponding endpoint device) that was previously assigned a particular IP address at a certain period of time and that endpoint device may have been compromised by malware.

As other illustrative examples, the first network sensor $300_1$ may be adapted to receive log information 372 from a DNS server, which provides the first network sensor $300_1$ with DNS requests made. Also, the first network sensor $300_1$ may be adapted to receive log information 372 from the DHCP server, which may be used to generate a device/IP address mapping. Combined with the user/IP address mapping, the user and device assigned to a particular IP address over the prolonged period of time may be uncovered for that IP address despite reassignment of the IP address during the prolonged period of time.

Besides log information 372, the first network sensor $300_1$ may be adapted to communicate and receive flow records 382 (e.g., netflow reocrds, sflow records, jflow records, etc.) from third-party flow record sources 380, namely information associated with communications received and/or monitored by other networks devices within the enterprise network 140 (e.g., IP address(es), port number(s), transport type, statistics concerning the network connection, etc.). The flow records 382 enables the data analysis engine 320 (or network sensor $300_1$ itself) to formulate a threat exposure mapping (e.g., display of communication paths undertaken by network devices within the enterprise network 140), which may be used to detect anomalous communication patterns through deviations in normal communications by one or more of the network devices, such as an endpoint device or server for example. In some embodiments, the first network sensor engine $300_1$ is adapted to extract and/or generate metadata from the flow records.

Besides receipt and processing of input information as described above, the first network sensor $300_1$ may be adapted to generate metadata in a normalized format that is readable by the data analysis engine 320. Some or all of the input information received by first network sensor $300_1$ is used to generate the metadata. Herein, as an optional feature, the metadata may be anonymized to remove sensitive or personalized information for the enterprise network 140. For instance, the metadata may be anonymized by substituting a user name associated with the input information being analyzed with a generic identifier. Additionally or in the alternative, the file name assigned to the input information or other properties may be substituted for corresponding generic identifiers, where these generic identifiers may be re-mapped by the first network sensor $300_1$ or another network device to recover the user name, file name and/or removed properties.

Normally positioned to reside within the enterprise network 240 of the particular customer, as shown in FIGS. 3A and 3B, the data analysis engine 320 is communicatively coupled to the network sensors $300_1$-$300_R$, and receives data from each of the network sensors $300_1$-$300_R$, referred to as network sensor data, that may include metadata and/or other data from the network sensor engines $300_1$-$300_R$ (e.g., raw logs, raw flow records, raw packet captures, raw host telemetry information) As an illustrative example, for HTTP traffic monitored by the network sensors $300_1$-$300_R$, the network sensor data may include, but is not limited or restricted to attributes within HTTP messages, including Host names, Referer, Uniform Resource Indicator (URI) or Uniform Resource Locator (URL), User-Agent, Mime-type, Method, Version, Cookie, Filename, Character set (Charset) or the like. According to one embodiment of the disclosure, the data analysis engine 320 may generate and/or update threat index values used in retention priority determinations by the network sensor $300_1$ (described below) based, at least in part, on this network sensor data.

Although the data analysis engine 320 is illustrated in FIGS. 3A-3B as being deployed within the enterprise network of a particular customer, the data analysis engine 320 may be deployed in a private cloud or in a public cloud.

Herein, the data analysis engine 320 is adapted to (i) provide open Application Programming Interface (API) access to the stored network sensor data and (ii) conduct analytics on the network sensor data. The analytics may be directed to conventional analytics, ad hoc analytics and predictive analytics.

Conventional analytics include established analytic techniques that are used to provide information associated with suspicious behaviors, where collectively, the suspicious behaviors may suggest malicious activity where one or more of the endpoint devices has been infected with malware. One analytical technique is Domain Generation Algorithm (DGA) to identify suspicious domain names that are contacted by the endpoint devices to receive updates or command.

The ad hoc analytics includes generation of a search display that enables network security personnel to conduct a keyword search to determine if a particular indicator of compromise (IOC) has already been received and processed by an endpoint device. The IOC may include contents from a particular IP address; communications with a particular domain name or IP address; download of a particular file name; a particular file hash value; or the like. Furthermore, the ad hoc analytics may generate a threat exposure mapping that outlines communications detected within the enterprise network or within a sandboxed environment that collectively identify malicious activity.

Predictive analytics comprises statistical modeling, machine learning and/or data mining for analyzing current and/or historical events in order to formulate determinations as to certain network devices within an enterprise network are compromised. For instance, data analysis engine 320 may analyze how certain events along with subsequent detected events may increase or decrease the likelihood of one or more of the network devices being compromised and infected with malware.

The data analysis engine 320 may include a data exchange engine (not shown) that performs collecting data, tokenizing or anonymizing the data (which is optional), and transmitting data to the centralized controller 340 for facilitating global threat intelligence. Furthermore, according to one embodiment of the disclosure, the data analysis engine 320 may generate and/or update threat index values used in retention priority determinations by the network sensor $300_1$ (described below) based, at least in part, on the collected data.

The data analysis engine 320 may include a local threat intelligence engine that locally caches global threat intelligence from the centralized controller 340 and a refined local threat intelligence for each customer or data analysis engine. The data analysis engine 320 may further include a user risk modeling engine that models and monitors the risk of threats for each individual user for a certain duration of time (which potentially can be essentially unlimited). The user risk modeling engine may take as inputs (1) prior threats as indicated from the centralized controller 340 and/or refined local threat intelligence, and/or (2) risks associated with user behavior changes perceived through the (meta)data collected by the data analysis engine 320. The resultant risk may be referred to as "threat index values". Of course, other risk modeling engines that model and monitor risks of threat for other flow attributes besides individuals users, such as endpoint devices, servers, group affiliations, flow destinations and/or objects within flows are deployed within the data analysis engine.

As an illustrative example, a prior threat input may be a situation when a user has an HTTP flow record to a certain domain A resolved to an IP address B with user-agent C that downloads a filename D. The risk for that HTTP flow can be computed by aggregating the prior risk probability of each of those attributes (Domain A, IP address B, user-agent C, and filename D), where the prior risk probability is queried from the global threat intelligence (either the cached version stored on the data analysis engine 320 or from the centralized controller 340).

Risks associated with user behavior changes may be determined through analysis of past behavior compared to current behavior. For example, for a particular user, all domains, port numbers, IP addresses, destination countries, etc., that the user accessed during a certain period of time are stored and the behavior of traffic of that user to any new domain, IP address, destination countries that the user has never been before is monitored. Based on this data, a user-behavior based risk score may be generated. A profile of the distribution and/or aggregated counts of certain user behavior such as DNS queries, internal file downloads, server logins, etc. may be performed and any suspicious behavior changes may be monitored for (e.g., increased number of file downloads, failed logins, etc.) and used when generating the user-behavior based risk score.

The data analysis engines (not shown) of different customers are communicatively coupled to the centralized controller 340 and transmit information to the centralized controller 340. The information transmitted from the data analysis engines to the centralized controller 340 may be less and/or different than the information transmitted from the network sensors to their corresponding data analysis engines. Using the above illustrative example of HTTP traffic, the information transmitted from the network sensor $300_1$ may include host names, Referer, Uniform Resource Indicator (URI) or Uniform Resource Locator (URL), User-Agent, Mime-type, Method, Version, Cookie, and/or Character set (Charset), but not the filename field. Herein, as an optional feature, the information transmitted to the centralized controller 340 may be anonymized to remove sensitive or personalized information.

Although not illustrated in FIG. 3A, it should be understood that the network sensors of branch 355 and data center 360 may each receive host telemetry information from device sensor(s), network packet captures from packet capture device(s), third-party flow record information from third party flow record sources, and/or log information from third-party log sources.

Normally positioned outside the enterprise network 140 for communicative coupling to multiple data analysis engines associated with different customers, such as the data analysis engine 320, the centralized controller 340 facilitates automated collective intelligence by leveraging analytics from a specific customer deployment across an entire population of customers. Furthermore, the centralized controller 340 facilitates community-based collective intelligence by allowing customers to share and leverage security intelligence amongst each other. Also, the centralized controller 340 acts as an intermediary between the components of the security framework 210 and third party services such as external threat feeds 385 and enables security personnel to push threat intelligence to all customer deployments.

The external threat feeds 385 may include blacklisted domains, blacklisted IP addresses, blacklisted filenames and/or file hashes; as well as network sensor data related to that blacklisted data (e.g., threat types, botnet types, first-seen timestamp, last-seen timestamp, URI, etc.). The external threat feeds 385 can be used for customer threat reporting and/or with other data when generating the global threat intelligence.

Referring to FIG. 3B, in order to provide unified management of the security framework 210, a management system 390 may be communicatively coupled and provide control information 395 to the device sensor(s) $310_1$-$310_S$, network sensors $300_1$-$300_R$, and/or data analysis engine 320. Herein, according to one embodiment of the disclosure, the management system 390 is responsible for provisioning, monitoring operability and overall management of the device sensor(s) $310_1$-$310_S$, the network sensors $300_1$-$300_R$, and/or the data analysis engine 320. For instance, the provisioning may include conducting and managing software upgrades in order to increase the speed and ease of deployment and configuration of the security framework 210. Likewise, monitoring operability may include performing, in a periodic or aperiodic manner, health checks of the device sensor(s) $310_1$-$310_S$, network sensors $300_1$-$300_R$ and/or data analysis engine 320; collecting log information and performance data; and/or providing dashboards about overall health of the security framework 210.

Figure 4A:
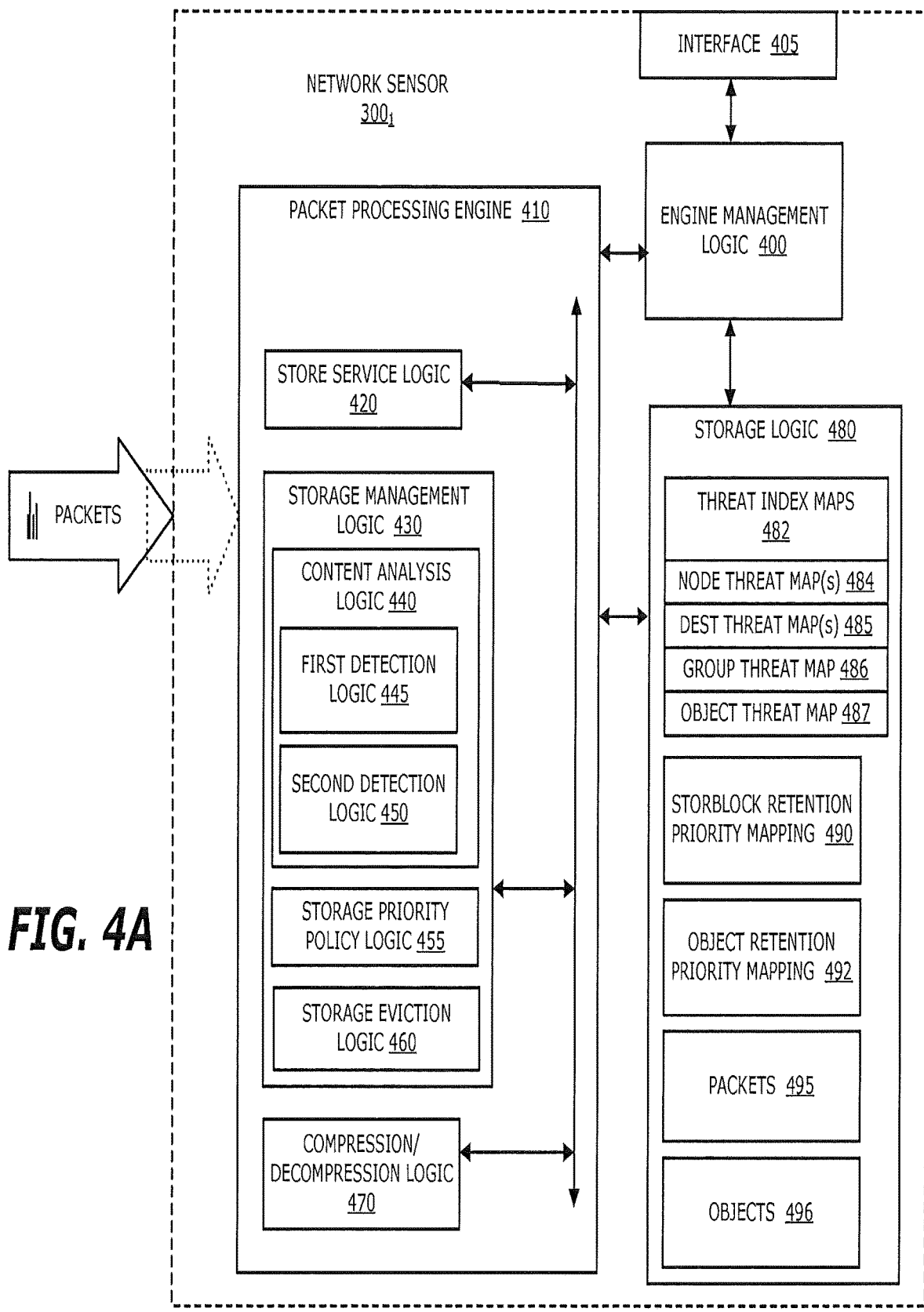
FIG. 4A is an exemplary embodiment of a logical representative of the network sensor engine of FIGS. 3A-3B.

Referring now to FIG. 4A, an exemplary embodiment of a logical representative of the network sensor $300_1$ of FIGS. 3A-3B is shown. Herein, the network sensor $300_1$ comprises engine management logic 400 communicatively coupled to a packet processing engine 410 and storage logic 480.

Herein, the engine management logic 400 is responsible for maintaining the storage priority policies utilized by a storage priority policy logic 455. More specifically, the engine management logic 400 is communicatively coupled to the data analysis engine 320 of FIG. 3A and/or third-party sources via an interface 405. Upon receipt of a storage priority policy (and/or corresponding policy updates) from the data analysis engine 320 and/or a third-party source via interface 405, the engine management logic 400 routes this policy (or policy updates) to the storage priority policy logic 455. The storage priority policy logic 455 is configured to generate and assign retention priorities to flows stored within certain storage blocks (e.g., StorBlocks and/or SubStors) as well as block priorities for these storage blocks.

Based on the storage priority policy (and/or policy updates), the storage priority policy logic 455 may alter how or when retention priorities and/or block priorities are computed. For example, a storage priority policy update may be directed to (1) altering which flow attributes are to be considered in generating the retention priority; (2) altering what weighting is applied to threat index values associated with these flow attributes; (3) altering when retention priorities are computed (e.g. altering a date/time for time-based priority scan); and/or (4) altering the weighting applied to retention priorities of the flows in determining block priorities for the storage blocks.

Besides storage priority policies, the engine management logic 400 may be responsible for uploading eviction policies to a storage eviction logic 460. The eviction policies may control the reclaiming of stored content (e.g., packets) stored in a first data store 495 and objects from the stored content that are optionally stored in a second data store 496. It is contemplated that the data stores 495 and 496 may be logical representations (e.g., software drivers) that control the reading/writing to the physical hardware storage situated within an electronic device including the network sensor $300_1$ or situated remotely from the network sensor $300_1$.

Figure 5A:
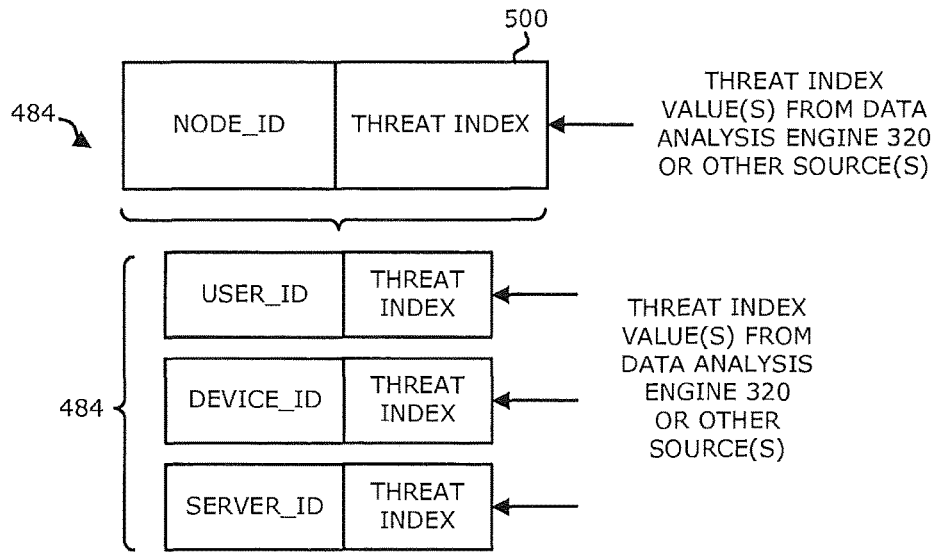
FIG. 5A is an exemplary embodiment of the setting of the threat index value associated with an entry of the Node threat map(s).

Additionally, the engine management logic 400 may be responsible for populating and controlling modifications of threat index values within the threat index maps 482 based on communications with the data analysis engine 320 and/or third-party sources. The setting of threat index values 500 within the node threat map(s) 484 is generally shown in FIG. 5A. These threat index values are used by the storage priority policy logic 455 to determine retention priorities assigned to different flows stored within particular storage blocks (e.g., StorBlocks and/or SubStors) in packet data store 495 or object data store 496. Examples of the threat index maps 482 may include, but are not limited or restricted to the following: (1) Node threat map(s) 484 being one or more maps that identify the threat (risk) levels for certain nodes (e.g., user, endpoint devices, servers); (2) Destination threat map(s) 485 being one or more maps that identify certain destinations (e.g., IP address, DNS, URL) for the stored flow; (3) Group threat map 486 to identify group affiliations for the nodes such as group memberships on a per user basis, group assignment of endpoint devices within a certain department, or group assignment of certain servers responsible for specific enterprise functionality; and/or (4) Object threat map that identifies threat index values associated with different types of objects (e.g., PDF documents, PDF documents with JavaScript®, Word documents, Word® documents with a HTML link, etc.).

As shown, the packet processing engine 410 is a multi-threaded process that is capable of running multiple services on the same packet or object concurrently and assigning retention priorities to different storage blocks of the storage logic 480 based on flow attributes associated with their stored content. According to one embodiment of the disclosure, the packet processing engine 410 comprises store service logic 420, storage management logic 430, and/or compression/decompression logic 470.

The store service logic 420 is responsible for controlling the storage of data within storage logic 480. More specifically, based on receipt of a storage request from the storage management logic 430, the store service logic 420 may reserve a storage block (e.g., StorBlock) or a portion of the storage block (e.g., SubStor), where one or more identifiers associated with the reserved storage block (e.g., StorBlock_ID and/or SubStor_ID) may be returned by the storage service logic 420 to the storage management logic 430. Upon filling the storage block and compressing at least a portion of the stored content, the StorBlock_ID and/or SubStor_ID are returned along with the data for storage. For clarity sake, further discussion of the priority assignment scheme will be directed to priority management associated with one type of storage block, namely StorBlocks, although the scope of the invention is applicable to all types of storage blocks including SubStors.

As shown in FIG. 4A, the storage management logic 430 includes content analysis logic 440, priority policy logic 455 and storage eviction logic 460. In general, the content analysis logic 440 is adapted to analyze data (e.g., packet data that may include objects) associated with a flow to be stored in order to identify certain flow attributes (factors) associated with the flow. Identifiers for these flow attributes are stored within StorBlock Priority mapping 490. Additionally, as an optional feature, the content analysis logic 440 may further identify one or more objects that are part of the flow. Identifiers for these objects are stored within an Object Priority mapping 492.

Figure 5B:
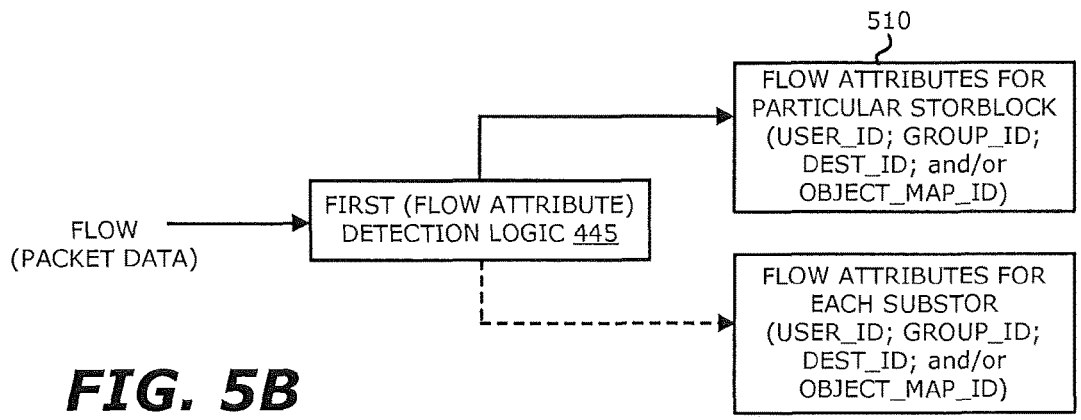
FIG. 5B is an exemplary embodiment of the identification of the flow attributes by a portion of the content analysis logic within the packet processing engine of FIG. 4A.
Figure 5C:
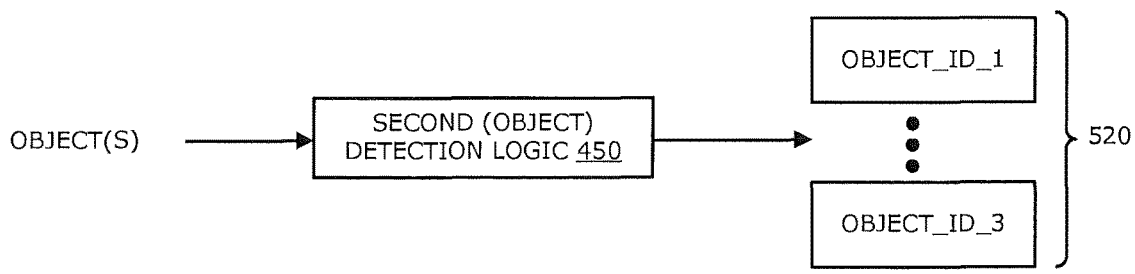
FIG. 5C is an exemplary embodiment of the identification of objects within the flow by a portion of the content analysis logic within the packet processing engine of FIG. 4A.

More specifically, the content analysis logic 440 comprises a first detection logic 445 and a second detection logic 450. Upon receiving a flow, the first detection logic 445 analyzes the flow and identifies certain flow attributes 510, as generally shown in FIG. 5B. These identified flow attributes 510 are stored within an entry within the StorBlock Priority Mapping 490 that corresponds to the flow and the StorBlock reserved to store the flow.

Where the flow includes one or more objects detected by the first detection logic 445, a second detection logic 450, operating in cooperation with the first detection logic 445, may be configured to identify the particular objects (e.g., three objects identified by Object_ID_1-3) 520 in lieu of the flow attributes, as generally shown in FIG. 5C. These object identifiers are entered into one or more entries of the Object Priority Mapping 492 to identify location within the object data store 496.

According to one embodiment of the disclosure, the first detection logic 445 is configured to identify a plurality of flow attributes and store identifiers associated with these attributes (Node_ID, Group_ID, Dest_ID, Object_Map_ID) within the StorBlock Priority Mapping 490. Herein, the "Node_ID" includes information that identifies the particular node (e.g., user, endpoint device, or server) that is the source and/or destination for the flow under analysis. The "Group_ID" includes information that identifies the group or groups to which the node belongs. The Dest_ID includes information that identifies the destination of the flow (e.g., IP address, DNS server identifier, URL, etc.). The "Object_Map_ID" includes information that identifies the object or objects being part of the flow (e.g., PDF file containing JavaScript®, Word Document, Word® document with macro, etc.). Each identifier (Node_ID; Group_ID; Dest_ID; Object_Map_ID) maps to an entry within a corresponding threat map, where the entry features one or more threat index values and different entries may have different threat index values.

For instance, as an illustrative embodiment, during collection of data associated with a flow for storage, the first detection logic 445 determines a first flow attribute associated with the flow, namely the particular node acting as the source the flow. Where the particular node is recognized and has a corresponding entry within the Node threat map(s) 484, the first detection logic 445 assigns an identifier (Node_ID) that identifies the particular node (e.g., user, endpoint device, server, etc.). The Node_ID references an entry within the Node threat map(s) 484 which includes a threat index value corresponding to that particular node. For instance, where the Node threat map(s) 484 comprises a set of threat maps (User threat map, Device threat map, Server threat map) in lieu of a single map and the Node_ID is directed to a particular user, the Node_ID references an entry within the User threat map.

Additionally or in the alternative, during collection of the data for storage, the first detection logic 445 determines a second flow attribute associated with the flow, namely the destination of the flow. The destination may be determined from an IP address, DNS address or DNS name, or URL within the 5-tuple of the flow. Where the particular destination is recognized and has a corresponding entry within a destination (DEST) threat map(s) 485, the first detection logic 445 assigns an identifier (Dest_ID) that references an entry within the DEST threat map(s) 485 that includes a threat index value corresponding to that particular destination. Where the DEST threat map(s) 485 comprises a set of threat maps (IP, DNS, URL) in lieu of a single map and the Dest_ID is directed to a particular IP address, the Dest_ID references an entry within the IP threat map.

Additionally or in the alternative, during collection of the data for storage, the first detection logic 445 determines a third flow attribute associated with the flow, namely a particular group that the identified node belongs. Where the particular group is recognized and has a corresponding entry within a group threat map, the first detection logic 445 assigns an identifier (Group_ID) that references an entry within the Group threat map 486 that includes a threat index value corresponding to that particular group.

Additionally or in the alternative, during collection of the data for storage, the first detection logic 445 determines a fourth flow attribute associated with the flow by assigning an identifier (Object_Map_ID) that references an entry within the Object threat map 487. Identifiers associated with these flow attributes (Node_ID; Dest_ID; Group_ID; Object_Map_ID) are stored within a StorBlock Priority Mapping 490.

As still shown in FIG. 4A, operating in cooperation with the first detection logic 445, the second detection logic 450 determines which object or objects (hereinafter "object(s)") associated with the flow that are placed into object data store 496. The identifiers for each of the object(s) are placed with Object Priority Mapping 492, which correspond to object(s) in data store 496.

With respect to the threat index maps 482, (e.g., the Node threat map(s) 484, the Destination threat map 485, the Group threat map 486 and the Object threat map 487), it is contemplated that threat index values for these maps 484-487 may be set by the data analysis engine 320 based on real-time or delayed analysis of network sensor data. For example, network sensor data associated with behaviors by a particular user may be used to dynamically set a threat index value associated with that user within the Node threat map(s) 484. Accordingly, the threat index values selected for each particular type of flow attribute (e.g., specific users, endpoint devices, servers, groups, destinations, objects) within a threat map signifies the level of suspiciousness that the specific type of flow attribute (sub-factor) is associated with malicious activity.

Herein, a listing of behaviors that may be considered in dynamic adjustment of threat index values associated with flow attributes being monitored by the data analysis engine 320. These behaviors are not exhausted, but are provided to illustrate the types of behaviors that may be considered for setting threat index values for particular flow attributes (nodes, destination, groups, objects).

(1) Node Behavior:
  (a) User behavior: This is behavior of the user independent of the electronic device being accessed. Such behaviors may include (i) access patterns to internal services; (ii) access patterns to servers with high-level access controls; (iii) access patterns of an external Internet destination; (iv) types of applications/browser used; (v) normal working hours for the user; (vi) user accesses the network from a remote location; and/or (vii) user is transferring a large number of files to a remote location.
  (b) Device behavior: This is behavior of the endpoint device with a set of installed applications and OS. Such behaviors may include (i) an endpoint device with vulnerable software based on updates detected; (ii) an endpoint device with a disabled firewall; (iii) an endpoint device with disabled anti-virus software; (iv) an endpoint device trying to access other network devices using administrator or other credentials; (v) traffic patterns such as DNS, SMTP, HTTP; (vi) beaconing traffic patterns; (vii) covert communication—using standard/known channels to communicate with external entities for command and control; and/or (viii) traffic to destination countries.

(c) Server behavior: This is a behavior that determines a level of importance for a particular server. Such behaviors may include (i) services offered by server (e.g., certificate issuance, financial, etc.); (ii) user/group login patterns and deviations from such patterns; (iii) amount of data downloaded from a specific endpoint device or user, where the relationship may be used to determine if the server is being used for hosting information for exfiltration; (iv) access patterns of the documents or records in a database; and/or (v) copying a large number of files.

(2) Destination: Behaviors for this flow attribute are directed to determine whether a level of suspiciousness for a destination (e.g., IP address, DNS or URL) of a flow. For instance, the destination information may be utilized to determine if (i) the destination is known to provide malicious executable; (ii) the destination enables Command and Control (C&C) communication; and/or (3) the DNS that is part of a bonnet service.

(3) Group: Behaviors for this flow attribute are directed to determine (i) access patterns between groups or group members; (ii) services shared between groups or group members; traffic patterns within a group; and/or (iv) traffic to destination countries.

(4) OBJECT: Behaviors for this flow attribute are directed to determine the presence of an object within a flow and the potential hazards that such object may cause. The threat index value may be based on internal or external analysis as to which types of objects denotes higher probability of being associated with malicious activity. Examples of such object types may include (i) a PDF file containing Javascript®; (ii) a document containing macros, scripts or any type of executable; (iii) hash of the content producing a hash value that matches a signature corresponding to known malware.

Referring still to FIG. 4A, the storage priority policy logic 455 is responsible for determining the retention priority for each flow. According to one embodiment of the disclosure, for each flow, the retention priority is based, at least in part, on (i) the priority policy in use, (ii) the flow attributes, and/or (iii) the threat index values associated with these flow attributes.

Figure 5D:
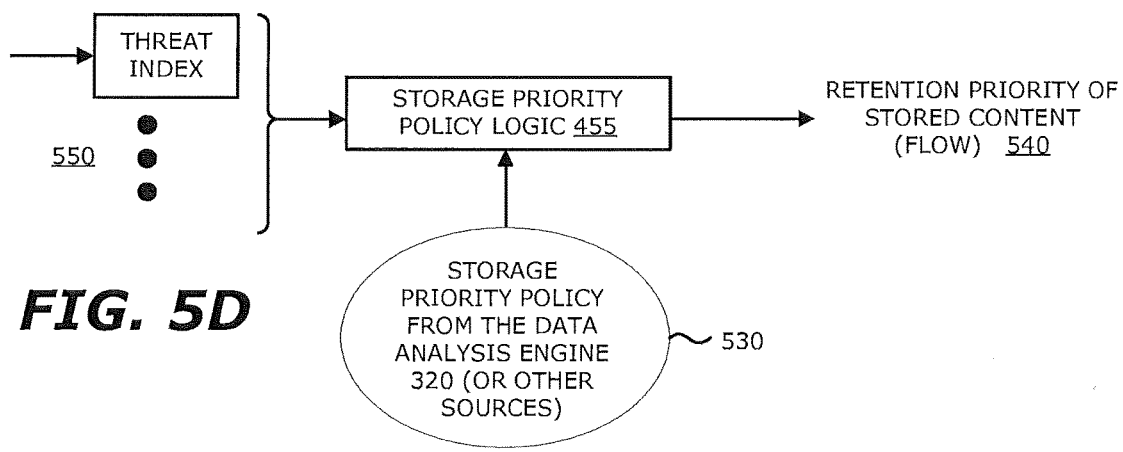
FIG. 5D is an exemplary embodiment of the generation of a retention priority associated with a flow by the storage priority policy logic of FIG. 4A.

Herein, a priority policy 530 is a set of rules that the storage priority policy logic 455 relies upon to compute the retention priority 540 for a flow based on the threat index values 550 assigned to select flow attributes, as generally shown in FIG. 5D. For example, the priority policy may identify what flow attributes are considered in computing the retention priority function. As another example, the priority policy may identify a weighting of threat index values associated with the selected flow attributes. For instance, the threat index value associated with a first flow attribute (Node_ID) may be assigned a weighting twice as great as any threat index value associated with other flow attributes (Dest_ID, Group_ID or Object_ap_ID). Based on the particular priority policy, the storage priority policy logic 455 generates a retention priority (e.g., a range of values such as 1-100), where one end of the range (e.g., "100") identifies the most critical content for retention while the other range (e.g., "1") identifies the least critical content for retention.

Figure 5E:
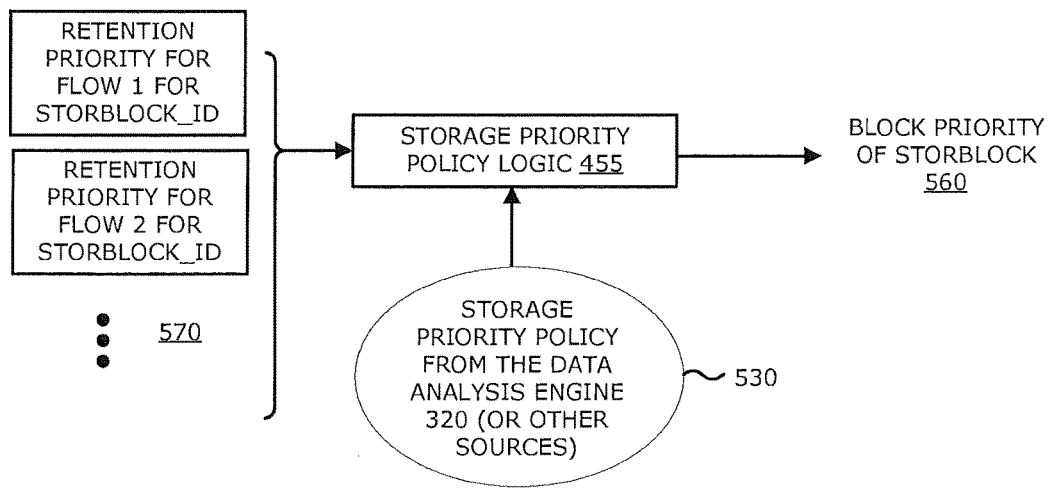
FIG. 5E is an exemplary embodiment of the generation of a block priority associated with a storage block by the storage priority policy logic of FIG. 4A.

Additionally, the storage priority policy logic 455 is responsible for determining the block priority 560 for each storage block, as generally shown in FIG. 5E. A block priority for a storage block is based, at least in part, on the retention priorities 570 associated with the flows stored within that storage block. Hence, the block priorities identify which storage blocks include flows with high retention priorities. For instance, deploying a storage priority policy where retention priorities for all flows are weight equally, the block priority would identify which storage blocks include a greater number of flows with high retention priorities. Similarly, deploying a storage priority policy where retention priorities for all flows are not weight equally, the block priority may identify which storage blocks include the greater number of flows with high retention priorities or the storage blocks having higher weighted flows.

Accordingly, referring to FIGS. 4A, 5D and 5E, the block priority 560 computed by the storage priority policy logic 455 identifies an order as to which storage blocks are best suited for eviction while the retention priority 540 computed by the storage priority policy logic 455 identifies the importance of retention among the different flows.

Referring back to FIG. 4A, the storage eviction logic 460 is responsible for monitoring storage capacity of the physical storage utilized by the network sensor $300_1$. Upon the storage capacity exceeds a storage threshold, such as exceeding a certain percentage of storage capacity (e.g., exceed 80% storage capacity), the storage eviction logic 460 commences operations to reclaim the physical storage by overwriting storage regions assigned lower retention priorities than other storage regions.

According to one embodiment of the disclosure, the storage eviction logic 460 transmits an eviction request (see FIG. 6) to the storage priority policy engine 455 to request priority information for use in eviction of currently written storage blocks to create needed storage space.

As an example, although not shown, the eviction request may include (1) a number of storage blocks (e.g. StorBlocks) needed to be evicted and/or (2) a maximum threshold retention priority for flows subject to eviction. Initially, the maximum threshold retention priority may be set to a low value (e.g., 10 out of 100) to avoid unnecessary eviction of useful content. In response, the storage priority policy engine 455 returns identifiers (e.g., StorBlock_IDs) of storage blocks to be potentially evicted ("low-priority StorBlocks") along with their block priorities. The number of StorBlock_ID and block priority pairings is normally greater than the number of storage blocks requested for eviction since each of the low-priority StorBlocks may have flows that need to be retained. In addition, the storage priority policy engine 455 returns identifiers of the flows (Flow_IDs or SubStor_IDs where flows are stored in designated SubStors), which are stored within the low-priority StorBlocks and have retention priorities that fall below the maximum threshold retention priority.

If the amount of storage provided by the flows exceeds the requisite storage space needed, the storage eviction logic 460 selects the number of needed flows having the lowest retention quality within the low-priority StorBlocks, copies the remaining flows from the low-priority StorBlocks to StorBlocks that are not being evicted, and thereafter, the low-priority StorBlocks may be erased (or prepared to receive new data). The remaining storage blocks having higher block priorities are retained.

If the amount of storage provided by the flows fails to provide the requisite storage space, the storage eviction logic 460 increases the number of StorBlocks for eviction to capture more StorBlocks with flows having retention priorities below the maximum retention priority threshold. This eviction process would continue as described above until, despite all of the StorBlocks being evaluated and the amount of StorBlocks still fails to provide the requisite storage space, the maximum retention priority threshold may be increased and the eviction process is repeated.

Compression/Decompression logic 470 handles compression of contents within a SubStor of the StorBlock prior to being written to physical storage. The compression is performed on at least the body of the stored packets and perhaps a portion or the entire header of the packet. It is contemplated that the size of the SubStors can be manipulated to adjust for gains in storage after compression is conducted. Of course, when the packets are retrieved, the SubStor needs to be decompressed by the compression/decompression logic 470 before extracting the content of the packet data.

Figure 4B:
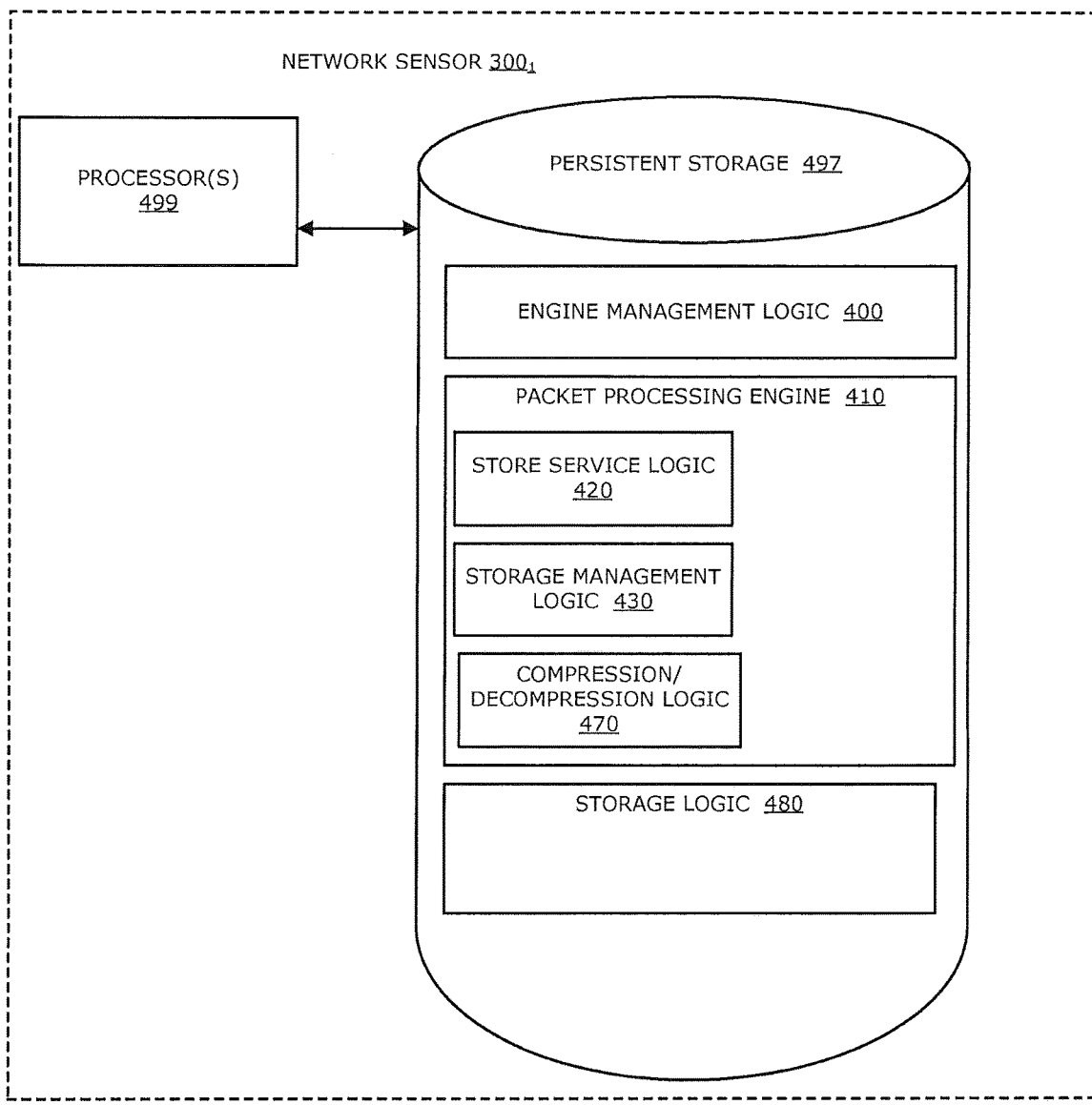
FIG. 4B is another exemplary embodiment of the network sensor engine of FIGS. 3A-3B.

Another illustrative embodiment is illustrated in FIG. 4B, in which the packet processing engine 410 is represented as software that is stored within persistent storage 497 and executed by one or more hardware processors 499. It is further noted that the storage logic 480 may be implemented as a software driver that controls storage within persistent storage 497.

IV. Exemplary Priority Assignment Scheme

Figure 6:
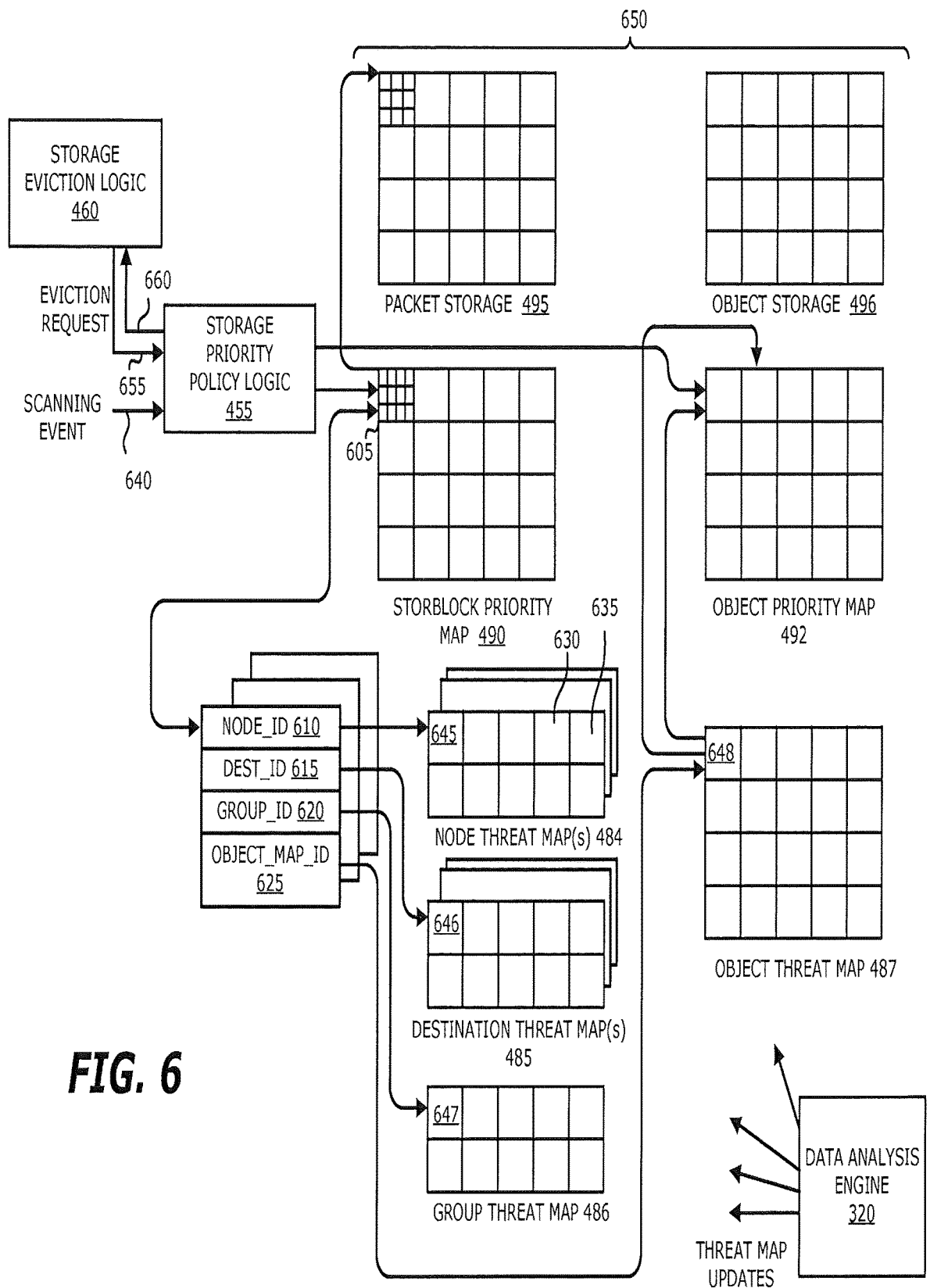
FIG. 6 is an exemplary block diagram illustrating the prioritization of storage blocks and flows within the storage blocks.

Referring now to FIG. 6, an exemplary block diagram illustrating the prioritization of storage blocks and flows within the storage blocks is shown. Herein, as described previously, upon receiving incoming flows of data for storage, the flow attributes associated with each of these flows are determined and assigned identifiers. According to this embodiment of the disclosure, the flow attributes provide information directed to (1) the node that provided the flow (e.g., user, device, or server); (2) the destination of the flow (e.g., IP address, DNS, URL); (3) the group to which the node is associated; and/or (4) the object(s) detected to be part of the flow. Herein, the detected flow attributes for flow 600 stored within a first StorBlock 605 (StorBlock_ID_1) is identified as Node_ID 610; Dest_ID 615; Group_ID 620; and/or Object_Map_ID 625 and are stored in StorBlock Priority map 490.

Each identifier for a particular flow attribute references a particular entry in a threat map corresponding to that attributes. For instance, a first flow attribute (node) for a flow provided by User A would identify User A (e.g., Node_ID (User_A)) and would correspond to a particular entry 630 within the node threat map(s) 484 such as the user threat map. Similarly, a flow provided by User B would identify User B (e.g., Node_ID(User_B)) and would correspond to a particular entry 635 within the node threat map(s) 484. The threat maps 482 are maintained by the data analysis engine 320.

In response to a scanning event 640, such as a time-based scan conducted periodically or aperiodically, the storage priority logic 455 conducts operations to determine (i) retention priorities for stored flows and (ii) block priorities for each storage block. As shown, flow attributes for flow 600, namely Node_ID 610, Dest_ID 615, Group_ID 620 and Object_Map_ID 625, are used to uniquely access threat index values within entries 645-648 of Node threat map(s) 484, Destination threat map(s) 485, Group threat map 486 and Object threat map 487, respectively. These threat index values are returned to the storage priority logic 455. Given that the Object_Map_ID 625 identifies may have a combined threat index of both objects, which are used to determine the total object threat index value for that flow.

Upon receipt of the threat index values, the storage priority logic 455 determines the retention priority for flow 600. This process continues for other flows (e.g., identified by the grid within the first StorBlock 605) until the retention priorities are generated. The storage priority logic 455 determines the block priority for the first StorBlock 605 based on the retention priorities for its flows. It is contemplated that the priorities may be determined concurrently (for a period of time) or may be determined sequentially.

The storage eviction logic 460 monitors storage capacity of the physical storage 650. Upon the storage capacity exceeds a storage threshold, such as exceeding a certain percentage of storage capacity (e.g., exceed 80% storage capacity), the storage eviction logic 460 transmits an eviction request 655 to the storage priority policy engine 455 to request priority information for use in eviction of a prescribed number of storage blocks in order to create ample free storage space to avoid a throttling eviction condition.

As shown in FIG. 6, the eviction request 655 includes (i) a number of storage blocks (e.g., 2 StorBlocks) needed to be evicted and/or (ii) a maximum threshold retention priority (priority=10) for flows subject to eviction. In response, the storage priority policy engine 455 returns a response 660 that includes identifiers for six (3) storage blocks (e.g., StorBlock_ID_1, StorBlock_ID_3, StorBlock_ID_5) along with their block priorities (e.g., BP_1, BP_3, BP_2). Additionally, the storage priority policy engine 455 returns identifiers of each of the flows with retention priorities that fall below the maximum threshold retention priority that are present in StorBlock_ID_1 (e.g., Flow_ID1-5), StorBlock_ID_3 (e.g., Flow_ID6-8), StorBlock_ID_5 (e.g., Flow_ID20-24).

If the amount of storage provided by the provided flows (e.g., Flow_ID1-8,20-24), meets or exceeds two StorBlocks of available storage space, the storage eviction logic 460 selects the least number of flows with the lowest retention priorities (e.g., Flow_ID1-8,20-22), copies the remaining flows within these lower priority StorBlocks (e.g., StorBlock_ID_1, StorBlock_ID_3, and StorBlock_ID_5) are copied into one or more of the non-evicted storage blocks. Thereafter, the content within the lower priority StorBlocks is erased (or the lower priority StorBlocks are otherwise prepared to receive new data).

If the amount of storage provided by the flows fails to provide two StorBlocks, the storage eviction logic 460 increases the number of StorBlocks (3) for eviction to capture one or more additional StorBlocks with flows having retention priorities below the maximum retention priority threshold. If storage requires continue to not be met, the process continues until all of the StorBlocks are evaluated, at which time, the maximum retention priority threshold may need to be increased and the eviction process repeated.

It is contemplated that the eviction process for the objects contained in object data store 496 are accomplished in the same fashion, but may be independent from eviction of flows. In some cases, it may be desirable to retain the objects in a particular evicted flow because object analysis revealed that the object was suspicious and this object may be associated with a user who is not assigned a high threat index value yet. Also, in other cases, it may be desirable to retain objects for users who are already assigned a high threat index as it appears that the user's endpoint device is operating in an infected state and most transactions involving the user and/or endpoint device will reveal significant information concerning the malware infection.

Figure 7:
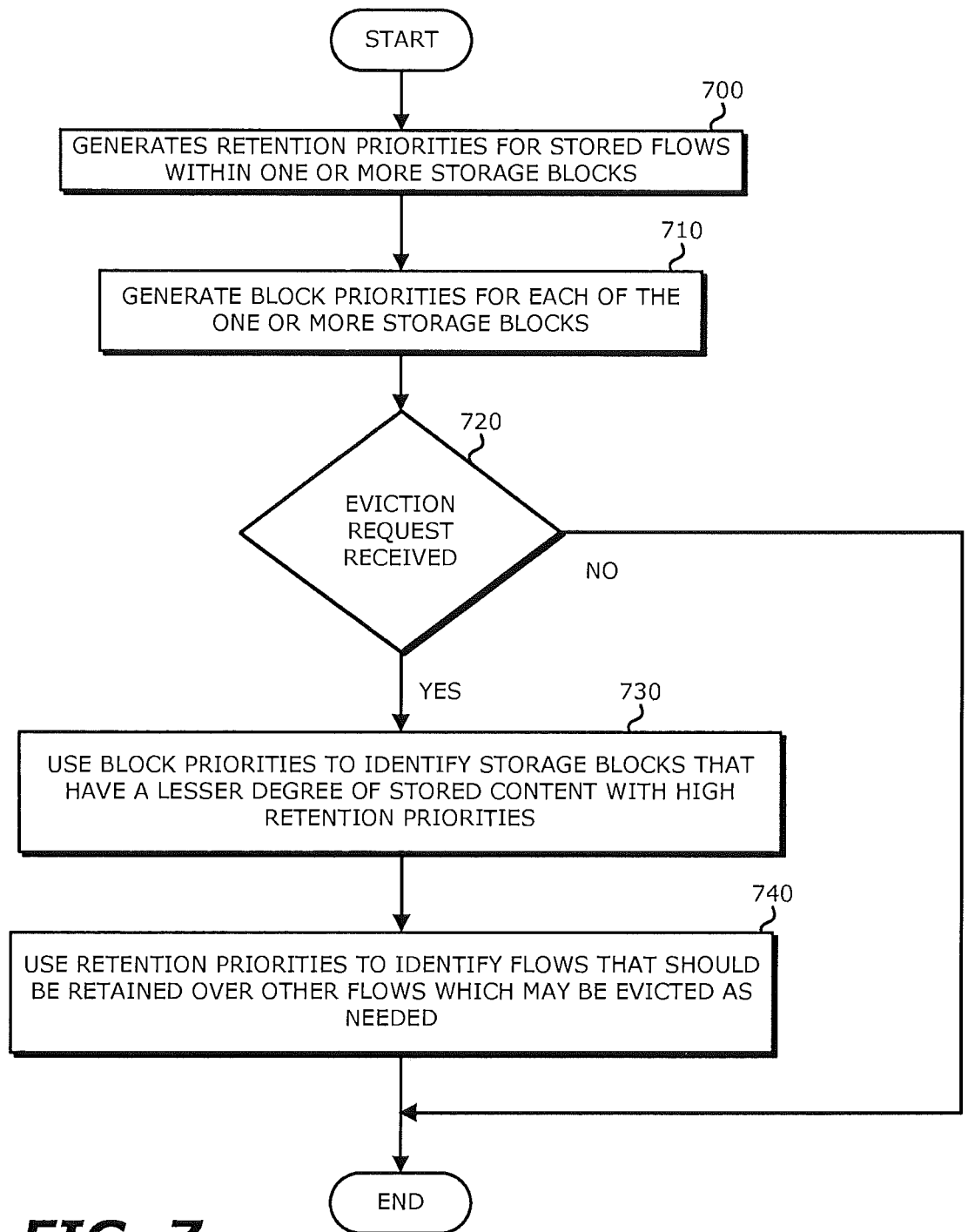
FIG. 7 is an illustrative flowchart of a generalized priority assignment scheme.

Referring now to FIG. 7, an illustrative flowchart of a generalized priority assignment scheme is shown. Herein, logic within a network device generates retention priorities for stored flows within one or more storage blocks (block 700). According to one embodiment of the disclosure, each retention priority for a flow is based, at least in part, on threat index values that correspond to flow attributes for that flow. The generation of the retention priority may be initiated in response to an event (e.g., time-based scan, request to evict storage blocks to create more free storage space, etc.).

Subsequent or at least partially concurrent with the generation of the retention priority, logic within the network device generates block priorities for each of the one or more storage blocks (block 710). According to one embodiment of the disclosure, each block priority for a storage block is based, at least in part, the retention priorities for the flows stored within that storage block.

Thereafter, in response to an eviction request (block 720), the block priorities may be used to identify those storage blocks that, when evaluated in a collective manner, have a lesser degree of stored content with high retention priorities (block 730). For instance, the block priorities may identify storage blocks having a small number flows with high retention priorities (e.g., 90 out of 100 scale) and a substantial number of flows with low retention priorities (e.g. less than 10 out of 100 scale). The block priorities may identify which storage blocks include a greater number of flows with high retention priorities than other storage blocks. The retention priorities may be used to identify those flows that should be retained over other flows, namely flows with retention priorities below a set threshold, which may be evicted as needed (block 740).

In the foregoing description, the invention is described with reference to specific exemplary embodiments thereof. It will, however, be evident that various modifications and changes may be made thereto without departing from the broader spirit and scope of the invention.

What is claimed is:

1. A method for controlling eviction for improved detection of malware, comprising:
   generating a retention priority for each flow of a plurality of flows stored within each of a plurality of storage blocks within a memory device, wherein each of the plurality of flows comprises information obtained from a plurality of related packets received over a network and each retention priority represents a value signifying a likelihood of a corresponding stored flow of the plurality of flows including data for use in identifying particulars associated with a malicious event that is part of a network breach to assist in remediation;
   in response to an eviction request upon determining that a storage capacity of the plurality of storage blocks exceeds a predetermined storage capacity level, identifying a block priority for each of the plurality of storage blocks, a block priority of a first storage block of the plurality of storage blocks being based on one or more retention priorities each associated with one of a first plurality of flows stored within the first storage block and a block priority of a second storage block of the plurality of storage blocks being based on one or more retention priorities each associated with one of a second plurality of flows stored within the second storage block, the block priority for each of the plurality of storage blocks identifying an order of eviction for the plurality of storage blocks, where at least the first storage block, having a lower block priority than the block priority of the second storage block, is to be evicted while the second storage block is retained; and
   using retention priorities of the first plurality of flows stored within the first storage block to identify one or more flows of the first plurality of flows to be retained and copied to one of the plurality of storage blocks other than the first storage block.

2. The method of claim 1, wherein a retention priority of a first flow of the first plurality of flows stored within the first storage block is based on a particular node that is a source of the first flow and the retention priority is generated in accordance with one or more rules processed by storage priority policy logic.

3. The method of claim 1, wherein a retention priority of a first flow of the first plurality of flows stored within the first storage block is based on a destination of the first flow stored within the first storage block.

4. The method of claim 3, wherein the retention priority of the first flow is a value that identifies a likelihood that an attribute of the first flow is associated with the malicious event prior to storage as part of the first storage block.

5. The method of claim 1 further comprising:
   copying the one or more flows to be retained within the first storage block and retention priorities associated with the one or more flows to the second storage block prior to reclaiming storage space in the memory device associated with the first storage block.

6. The method of claim 1, wherein the eviction request identifies a retention priority level being used by a storage priority policy logic of the memory device to determine the one or more flows of the first plurality of flows exceeding the retention priority level are to be retained and whether any of the first plurality of flows with retention priorities falling below the retention priority level are subject to eviction.

7. The method of claim 1 further comprising computing the block priority for each of the plurality of storage blocks based on retention priorities of one or more flows within each of the plurality of storage blocks, the block priority for each of the plurality of storage blocks comprises (i) the block priority of the first storage block based on retention priorities of the first plurality of flows stored within the first storage block and (ii) the block priority of the second storage block based on retention priorities of the second plurality of flows stored within the second storage block, wherein the block priority of the first storage block being less than the block priority of the second storage block to identify the first storage block being evicted prior to the second storage block.

8. The method of claim 1, wherein the block priority of the first storage block and the block priority of the second storage block are retained in a priority map.

9. The method of claim 1, wherein the data associated with each of the plurality of flows further assisting assist in remediation of the malware responsible for the network breach.

10. A method comprising:
    generating a retention priority for each of one or more flows associated with a first storage block of a memory device, wherein each flow of the one or more flows comprises information obtained from a plurality of related packets received over a network;
    generating a block priority for each of a plurality of storage blocks, a block priority of a first storage block of the plurality of storage blocks is based on retention priorities associated with the one or more flows stored within the first storage block and a block priority of a second storage block of the plurality of storage blocks is based on retention priorities associated with one or more flows stored within the second storage block, the block priority for each of the plurality of storage blocks identifying an order of eviction for the plurality of storage blocks; and in response to an eviction request initiated when a storage capacity of the plurality of storage blocks exceeds a predetermined storage capacity level, evicting the first storage block and retaining the second storage block when the block priority of the first storage block is less than the block priority of the second storage block, wherein each of the retention priorities associated with the one or more flows stored within the first storage block represents a value signifying a likelihood of a corresponding flow of the one or more flows includes data for use in identifying particulars associated with a malicious event that is part of a network breach.

11. The method of claim 10, wherein the evicting of the first block includes reclaiming a physical storage associated with the first storage block by enabling the physical storage to be overwritten.

12. The method of claim 10, wherein a retention priority of a first flow of the one or more flows stored within the first storage block is based on either (i) a particular node that is a source of the first flow or (ii) a destination of the first flow stored within the first storage block.

13. A network sensor for detection of malware, comprising:
a data store that is to store (i) a plurality of threat index values including a threat index value for each flow attribute associated with a plurality of related objects corresponding to a first flow, the plurality of threat index values for use in generating retention priorities for a plurality of flows including the first flow where each retention priority of the retention priorities being a value representing whether information associated with a flow of the plurality of flows corresponding to the retention priority has a higher probability of including particulars associated with a malicious event that is part of a network breach;
a hardware processor to (i) generate a retention priority for at least the first flow within a first storage block of a plurality of storage blocks, (ii) identify, in response to an eviction request initiated when a storage capacity of the plurality of storage blocks exceeds a predetermined storage capacity level, a block priority for each of the plurality of storage blocks in which a block priority of the first storage block is partially based on the retention priority of the first flow and a block priority of a second storage block of the plurality of storage blocks is based on retention priorities associated with flows stored within the second storage block, and (iii) identify, through use of retention priorities of stored flows within the first storage block, including the retention priority of the first flow, one or more flows of the stored flows to be retained and one or more flows of the stored flows are to be evicted.

14. The network sensor of claim 13, wherein the retention priority of the first flow is based on a particular node that is a source of the first flow and the retention priority is generated in accordance with one or more rules processed by storage priority policy logic.

15. The network sensor of claim 13, wherein the retention priority of the first flow is based on a destination of the first flow.

16. The network sensor of claim 13, wherein the retention priority of the first flow is a value that identifies a likelihood that one or more flow attributes of the first flow is associated with the malicious event prior to storage as part of the first storage block.

17. The network sensor of claim 13, wherein the block priority of the first storage block is based on retention priorities of all of the stored flows within the first storage block and the block priority of the second storage block is based on retention priorities of all of the flows stored within the second storage block.

18. The network sensor of claim 13, wherein the hardware processor communicatively coupled to storage management logic that includes a storage eviction logic that, when executed by the hardware processor, copying the one or more flows of the stored flows to be retained within the first storage block copied to one of the plurality of storage blocks other than the first storage block prior to reclaiming storage space associated with the first storage block in a memory separate from the data store.

19. The network sensor of claim 13, wherein the hardware processor communicatively coupled to storage management logic that includes
a storage eviction logic that, when executed by the hardware processor, (i) monitors storage capacity of physical storage represented by the plurality of storage blocks, and upon exceeding a particular storage capacity, (ii) commences operations to reclaim a portion of the physical storage by overwriting one or more of the plurality of storage blocks assigned lower retention priorities than other storage blocks of the plurality of storage blocks.

20. The network sensor of claim 19, wherein the hardware processor communicatively coupled to the storage management logic that further includes
a storage priority policy logic that, when executed by the hardware processor, generates and assigns retention priorities to the stored flows stored within the first storage block of the plurality of storage blocks.

21. The network sensor of claim 20, wherein the storage priority policy logic further generates and assigns retention priorities to each of the plurality of storage blocks.

* * * * *